July 20, 1965 J. BLIZARD 3,195,515
VAPOR GENERATOR
Original Filed Oct. 9, 1961 2 Sheets-Sheet 2
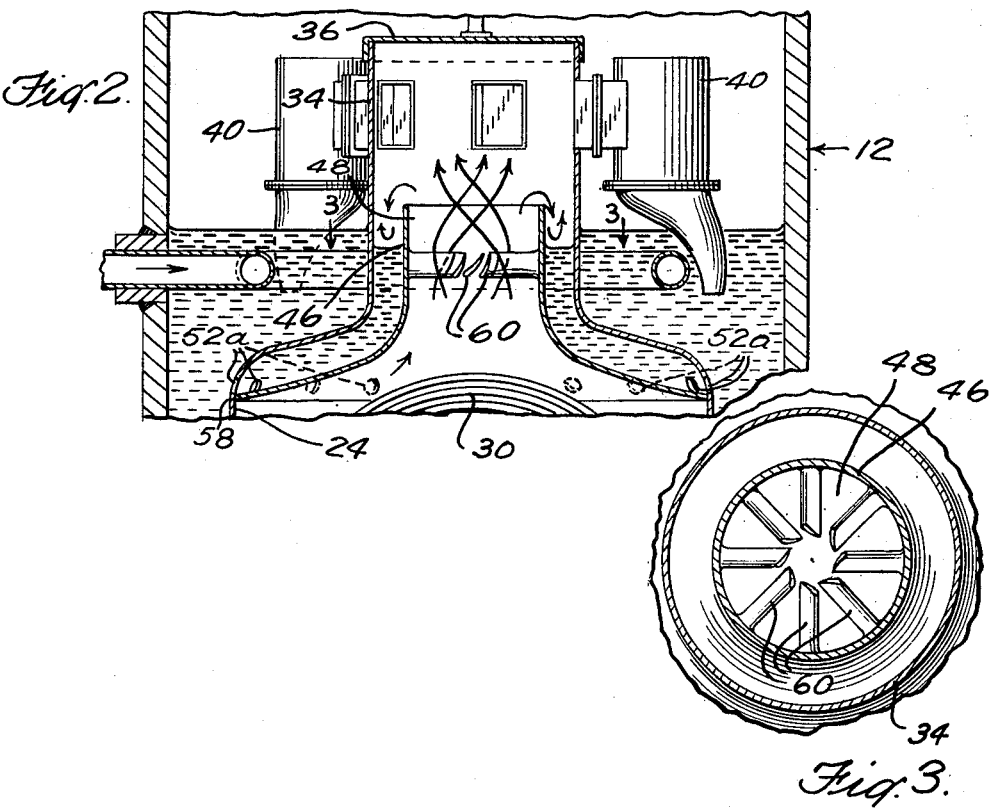
INVENTOR
JOHN BLIZARD
BY
Richard H. Thomas
ATTORNEY United States Patent Office 3,195,515
Patented July 20, 1965

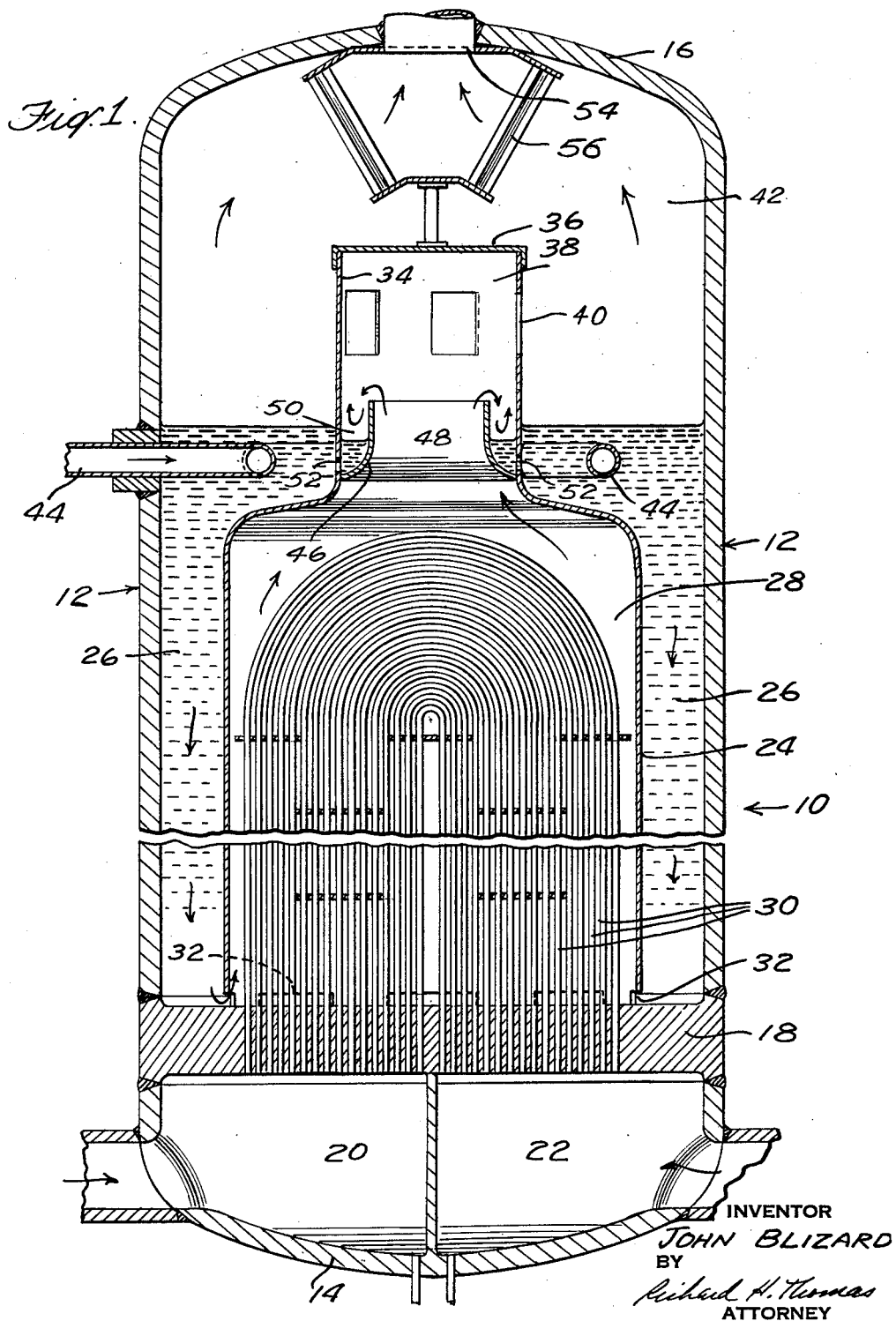

3,195,515
VAPOR GENERATOR
John Blizard, Garden City, N.Y., assignor to Foster Wheeler Corporation, New York, N.Y., a corporation of New York
Continuation of abandoned application Ser. No. 143,776, Oct. 9, 1961. This application Mar. 22, 1963, Ser. No. 267,212
3 Claims. (Cl. 122—34)

This application is a continuation of application Serial No. 143,776, filed by me on October 9, 1961, and now abandoned.

This invention relates to a vapor generator of the shell and tube type having a vapor generation chamber and a hot fluid flow through generator tubes within the chamber, and specifically to an improved means for reducing the amount of water carried to the vapor-liquid mixture leaving the generator.

A conventional steam generating unit of the type contemplated may comprise an elongated vertically oriented pressure vessel of circular cross-section with a cylindrical baffle within the vessel defining a vapor generation chamber and an annular downcomer passageway between the baffle and the wall of the pressure vessel. Hot, liquid heated, tube bundles may be disposed within the vapor generation chamber, and a vapor-liquid collection chamber may be located above the generation chamber. The collection chamber is adapted to be in communication with a vapor space of the pressure vessel through a vapor-liquid separating means, or separator, whereby the separated steam passes into the vapor space, while the separated liquid flows to the annular downcomer passageway.

Because of the large amount of water flowing from the generation chamber in the vapor-liquid mixture, an excessive pressure drop may be experienced through the separating means, or an excessive load may be imposed on it. In the latter instance, the high water content of the vapor flowing into the vapor space requires a second separator with added equipment costs and with an additional pressure drop.

According to the present invention, means are provided for reducing the amount of water carried in the vapor-liquid mixture leaving the vapor generation chamber to overcome the excessive pressure drop and load experienced in conventional equipment. Essentially, the invention resides in providing between the vapor generation chamber and collection chamber an upwardly directed skirt depending from the inner surface of the collection chamber and defining a constricting or narrowing passageway through which the vapor and liquid mixture flows. The skirt is arranged to define with the inner wall of the collection chamber an annular channel encompassing the passageway, and means are provided for fluid flow from the channel to the vapor generation chamber or to the downcomer passageway. Vane means may be disposed in or below the constricting passageway to impart a whirling motion to the upwardly flowing vapor-liquid mixture.

The skirt is so disposed as to cause the accelerated vapor-liquid mixture to expand outwardly into the collection chamber and to flow against the walls of the chamber or downwardly into the channel formed by the skirt and chamber walls. This flow pattern is enhanced by the vanes imparting to the mixture a whirling flow. A vapor-liquid separation is effected by the change in direction imparted to the flow and by the impinging of the flow against the chamber walls. The liquid so separated is collected in the channels formed by the skirt and chamber walls, and is permitted to flow through aperture means in the channels to the downcomer passageway or liquid space of the pressure vessel or directly back to the vapor generation chamber.

The collection chamber also is provided with openings for the flow of vapor (now containing a lesser amount of liquid) to the vapor space of the vessel, although additional vapor-liquid separating means may be interposed between the collection chamber and the vapor space.

For the purposes of this application, the term "separator" is used to designate apparatus which separates substantial amounts of water from a mixture of steam and water containing a large amount of water, and the term "drier" is used to designate apparatus for removing water from a mixture containing small amounts of water, in the order of one to five lbs. of water for 99 to 95 pounds of steam. Also, for the purposes of this application, the term "riser" is used to describe an elongated chamber arranged for the collection and upward flow of a vapor and liquid mixture, wherein the diameter of the chamber is relatively large as compared to the riser tubes of a conventional land boiler installation.

Further details and advantages of the invention will become apparent upon consideration of the specification and accompanying drawings, in which:

FIGURE 1 is a vertical sectional view of a vapor generating unit embodying the concepts of the present invention;

FIGURE 2 is a sectional view of a vapor generating unit illustrating an embodiment of the invention;

FIGURE 3 is an enlarged scetional view taken along line 3—3 of FIGURE 2.

Referring to FIG. 1, there is illustrated a vapor generating unit 10 comprising an elongated, vertically disposed, cylindrical pressure vessel 12 having, at the top and bottom of the vessel, upper and lower hemispherical heads 14 and 16. A tube sheet 18 is disposed across the bottom of the vessel dividing the vessel into upper and lower areas, the lower area containing the inlet and outlet chambers 20 and 22 for the flow of hot fluid into and out of the vessel. The upper area is divided by a cylindrical inner shell or baffle 24 into a downcomer passageway 26 and a vapor generation chamber 28. A tube bundle 30 consisting of U-shaped tubes is disposed within the vessel generation chamber 28, the ends of the tubes being fastened to the tube sheet 18 and in communication with the hot fluid inlet and outlet chambers 20 and 22. The bottom edge of the cylindrical baffle 24 engages the tube sheet 18, but is provided with apertures 32 communicating the lower end of the downcomer passageway 26 with the lower portion of the vapor generation chamber 28, whereby water in the downcomer passageway may enter and circulate within the vapor generation chamber.

The upper portion 34 of the baffle 24 is of a reduced diameter and is closed at its top by a plate 36 defining within the upper portion a vapor-liquid collection chamber 38. Means 40 are provided communicating the collection chamber 38 with a vapor space 42 of the pressure vessel, which means may be openings as shown in the form of slots disposed in the side wall of the collection chamber, or vapor-liquid separators designed for efficient vapor-liquid separation. For instance, although the slots alone are effective vapor-liquid separators (the step of reducing the area of flow itself providing an effective separation), the means 40 may comprise whirl chambers of a known type designed to separate the vapor-liquid mixture into a vapor stream passing into the vapor space of the vessel and a liquid stream passing into the downcomer passageway, or other such means. For the purposes of this application, the term separator shall be deemed to comprise any arrangement including apertures or flow restricting means associated with risers or vapor-liquid collection chambers for vapor generating units.

Liquid is admitted to the vessel by means of a toroidal feed water pipe 44 disposed below the water level in the vessel and immediately above the downcomer passageway 26.

The invention resides in disposing within the vapor-liquid collection chamber and upwardly directed skirt 46 depending from the inner surface of the annular wall of the collection chamber and defining a central, narrowing passageway 48 for the flow of the vapor-liquid mixture from the vapor generation chamber 28 to the collection chamber 38. Preferably, the skirt defines a streamlined orifice or nozzle, the upper edge of the skirt being at the narrow-most portion of the orifice or nozzle. The skirt also defines with the collection chamber wall an open-mouth, annular, channel 50 encompassing the flow passageway, the channel being adjacent to the side wall of the collection chamber. Aperture means 52 are provided in the wall of the collection chamber below the water level within the pressure vessel for the flow of water collected in the channel to the downcomer passageway.

A large portion of the flow of vapor and liquid upwardly through the constricting passageway 48 is diverted outwardly and downwardly against the side wall of the collection chamber and into the annular channel 50. The liquid particles in the mixture are separated from the vapor by the change in direction of flow in the channel and by impingement of the mixture against the inner surface of the collection chamber, which liquid is collected in the channel and passes to the downcomer passageway through the apertures 52. The vapor-liquid mixture containing a lesser water content continues through means 40, where further separation occurs, to the vapor space 42 and outwardly through a vapor outlet 54. Additional separation means 56 may be disposed adjacent the vessel outlet 54.

As illustrated in FIG. 1, the water level within the annular channel 50 is lower than the water level within the pressure vessel. This is caused by the difference in pressure between the vapor space of the vessel and the collection chamber. On the other hand, the circulation of water from the liquid space of the vessel or downcomer passageway into the vapor generation chamber is caused by a difference between the density of the liquid in the downcomer passageway and the density of the mixture in the vapor generation chamber.

It may be desirable to extend the skirt 46 further into the vapor generation chamber to permit the apertures 52 to be disposed a safer distance below the water level in the pressure vessel, in the event of large fluctuations in load imposed on the vapor generating unit and in large fluctuations in the water level within the vessel. It is important that apertures 52 be below the water level within the vessel to avoid the passage of vapor through the apertures.

This embodiment of the invention is illustrated in FIG. 2 and consists of depending the skirt 46 from baffle 24 from a point 58 well below the water level in the vessel, permitting the location of apertures 52a well below the water level.

FIG. 2 illustrates a further feature of the invention, namely, that of disposing within the passageway 48 a plurality of vanes 60 having a predetermined pitch and arranged to impart a whirling motion to the flowing vapor-liquid mixture. The arrangement of vanes is more clearly illustrated in FIG. 3, and should be such as to impart to the high velocity, flowing mixture a motion sufficient to impose a centrifugal force on the liquid particles causing the liquid particles to impinge on the inner surface of the collection chamber wall.

Although the invention has been described with reference to a specific type of generator, it will be apparent to those skilled in the art that the concepts of the invention are applicable also to other types of generators wherein means are provided for introducing into the riser a flow in which the amount of liquid is substantially greater than the amount of vapor. Other modifications will be apparent to those skilled in the art, and it is intended that the invention be limited only as defined in the following claims.

What is claimed is:

1. A vapor generator comprising pressure vessel means having a vapor space and a liquid space, baffle means within said vessel and in said liquid space defining a vapor generation chamber, means within said chamber for supplying heat to the liquid in said vessel to produce a vapor-liquid flow in which the amount of liquid is substantially greater than the amount of vapor, an elongated vertically oriented cylindrical riser having an upper outlet and a lower inlet end the latter in fluid communication with about the center portion of said vapor generation chamber, said riser being of smaller cross sectional area than said chamber and defining a wall which is continuous with said baffle means so that the peripheral flow of vapor and liquid from the chamber must pass upwardly and inwardly into the riser, means disposed within and secured to the riser at the inlet thereof defining a narrowing smooth-walled unobstructed passageway for said upward flow, said means further defining an annular open-topped channel encompassing the passageway for the spill-over of said peripheral flow, means communicating a lower portion of said channel with the liquid space of said pressure vessel to convey liquid in the channel from the channel, and vapor-liquid separators at the upper end of the riser arranged to receive the vapor and liquid flow, said separators being of the type designed to divide a flow containing a large amount of liquid substantially completely into a liquid stream of comparatively large mass and a vapor stream of comparatively small mass, the liquid separated from the vapor-liquid mixture in said channel serving to reduce the liquid content of the flow through the separators to thereby increase the capacity of the separators.

2. A vapor generator according to claim 1 wherein said means at the inlet of said riser comprises an upwardly and inwardly directed annular streamlined skirt defining said narrowing passageway, said skirt depending from the inner surface of the riser and defining the channel in combination with the riser wall.

3. A vapor generator according to claim 1 and further including vane means disposed within said narrowing passageway adapted to impart a whirling motion to said peripheral flow of a vapor and liquid through the passageway without obtaining undue mixing of said flow with the flow from the center of the passageway.

References Cited by the Examiner

UNITED STATES PATENTS 2,862,479  12/58  Blaser et al. _____ 122—34
3,057,333  10/62  Kuhner _____ 122—491

FOREIGN PATENTS 566,747  4/58  Belgium.

ROBERT A. O'LEARY, *Primary Examiner.*

KENNETH W. SPRAGUE, PERCY L. PATRICK, *Examiners.*